United States Patent
Filewich

(10) Patent No.: US 9,764,422 B2
(45) Date of Patent: Sep. 19, 2017

(54) SEQUENCING OF MULTI-PASS LASER SHOCK PEENING APPLICATIONS

(71) Applicant: UNITED TECHNOLOGIES CORPORATION, Farmington, CT (US)

(72) Inventor: Paul Filewich, Salem, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 114 days.

(21) Appl. No.: 14/763,109

(22) PCT Filed: Dec. 18, 2013

(86) PCT No.: PCT/US2013/076076
§ 371 (c)(1),
(2) Date: Jul. 23, 2015

(87) PCT Pub. No.: WO2014/143293
PCT Pub. Date: Sep. 18, 2014

(65) Prior Publication Data
US 2016/0001395 A1  Jan. 7, 2016

Related U.S. Application Data

(60) Provisional application No. 61/798,474, filed on Mar. 15, 2013.

(51) Int. Cl.
| | |
|---|---|
| *B23K 26/00* | (2014.01) |
| *B23K 26/03* | (2006.01) |
| *C21D 10/00* | (2006.01) |
| *F01D 21/00* | (2006.01) |
| *F01D 5/28* | (2006.01) |

(52) U.S. Cl.
CPC ........ *B23K 26/0069* (2013.01); *B23K 26/03* (2013.01); *C21D 10/005* (2013.01); *F01D 21/003* (2013.01); *F01D 5/286* (2013.01)

(58) Field of Classification Search
CPC ........ B23K 26/00; B23K 26/03; C21D 10/00
USPC .............. 219/121.6–121.62, 121.76, 121.83, 219/121.85
See application file for complete search history.

(56) References Cited

U.S. PATENT DOCUMENTS

| | | | |
|---|---|---|---|
| 6,144,012 A | 11/2000 | Dulaney et al. | |
| 2003/0024904 A1* | 2/2003 | H. Clauer | C21D 10/005 219/121.6 |
| 2003/0026700 A1* | 2/2003 | Clauer | C21D 10/005 416/241 R |

(Continued)

FOREIGN PATENT DOCUMENTS

EP  1122321 A2  8/2001

OTHER PUBLICATIONS

International Search Report Application No. PCT/US2013/076076 reported on Apr. 8, 2014.

*Primary Examiner* — Samuel M Heinrich
(74) *Attorney, Agent, or Firm* — Cantor Colburn LLP

(57) ABSTRACT

A method for laser shock peening (LSP) a workpiece is disclosed. The method may include identifying a geometry of the workpiece, determining a number of applications of LSP upon a first side and a second side of the workpiece, and sequencing the applications among the first side and the second side to minimize distortion.

20 Claims, 5 Drawing Sheets

(56) References Cited

U.S. PATENT DOCUMENTS

| | | | |
|---|---|---|---|
| 2004/0100638 A1* | 5/2004 | Folta | G02B 27/0012 |
| | | | 356/601 |
| 2004/0224179 A1 | 11/2004 | Sokol et al. | |
| 2004/0262277 A1* | 12/2004 | Mika | B23P 6/002 |
| | | | 219/121.85 |
| 2007/0003418 A1 | 1/2007 | Rockstroh et al. | |

* cited by examiner

SEQUENCING OF MULTI-PASS LASER SHOCK PEENING APPLICATIONS

CROSS-REFERENCE TO RELATED APPLICATION

This patent application is a US National Stage under 35 U.S.C. §371, claiming priority to International Application No. PCT/US13/76076 filed on Dec. 18, 2013, which claims priority under 35 U.S.C. §119(e) to U.S. Patent Application Ser. No. 61/798,474 filed on Mar. 15, 2013.

FIELD OF THE DISCLOSURE

The present disclosure relates generally to gas turbine engines and, more particularly, to a method for laser shock peening parts of a gas turbine engine.

BACKGROUND OF THE DISCLOSURE

Gas turbine engines may typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

Various parts of the gas turbine engine, such as compressor or turbine rotor blades, are susceptible to cracking from stress, fatigue and damage (e.g. foreign object debris). This damage can reduce the life of the part, requiring repair or replacement. To protect parts from crack initiation and propagation, residual compressive stresses can be imparted into the part by a material improvement process, such as shot peening, laser shock peening (LSP), pinch peening, and low plasticity burnishing (LPB). However, current application techniques of material improvement processes alter the profile or geometry of the part. For example, when an airfoil is treated with LSP, there is a distortion in twist and/or lean of the airfoil. Accordingly, there exists a need for a method to minimize the distortion in parts due to material improvement processes. This invention is directed to solving this need and others.

SUMMARY OF THE DISCLOSURE

According to one exemplary embodiment of the present disclosure, a method for laser shock peening (LSP) a workpiece is disclosed. The method may comprise identifying a geometry of the workpiece, determining a number of applications of LSP upon a first side and a second side of the workpiece, and sequencing the applications among the first side and the second side to minimize distortion.

In a refinement, the method may further comprise providing one application to the first side of the workpiece, and measuring a change in geometry of the workpiece.

In another refinement, the method may further comprise providing one application to the second side of the workpiece, and measuring a change in geometry of the workpiece.

In another refinement, the method may further comprise determining which side of the workpiece to apply a first application of LSP.

In another refinement, the method may further comprise determining a sequence of the applications based on measured changes in geometry of the workpiece after each successive application.

In another refinement, the method may further comprise using a coordinate measuring machine (CMM) to measure the geometry of the workpiece.

According to another exemplary embodiment of the present disclosure, a method for working an airfoil is disclosed. The method may comprise identifying an initial geometry of the airfoil, determining a number of applications of LSP upon each of a first side and a second side of the airfoil, and providing the applications in a sequence having a minimum amount of variation from the initial geometry of the airfoil.

In another refinement, the method may further comprise providing three applications to each of the first side and the second side of the airfoil.

In a refinement, the method may further comprise determining the sequence based on an amount of variation from the initial geometry of the airfoil after each application.

In another refinement, the method may further comprise providing the sequence as a first application to the first side, a second application to the second side, a third application to the second side, a fourth application to the first side, a fifth application to the first side, and a sixth application to the second side.

According to yet another exemplary embodiment of the present disclosure, a method for manufacturing an airfoil of a gas turbine engine is disclosed. The method may comprise measuring an initial geometry of the airfoil, determining a number of applications of laser shock peening to provide on the airfoil, determining a sequence for the applications, determining a new geometry for the airfoil based on the initial geometry and the sequence, providing an airfoil according to the new geometry, and applying the sequence on the airfoil having the new geometry.

In a refinement, the method may further comprise measuring the initial geometry of the airfoil, including at least one of thickness, chord length, camber, twist, and lean.

In another refinement, the method may further comprise applying a first application to a pressure side of the airfoil.

In another refinement, the method may further comprise providing a second application to a suction side, a third application to the suction side, a fourth application to the pressure side, a fifth application to the pressure side, and a sixth application to the suction side.

In another refinement, the method may further comprise providing applications to the pressure and suction sides of the airfoil and measuring variations in geometry to determine the sequence.

In another refinement, the method may further comprise determining the sequence based on a sequence having a smallest amount of variation in geometry.

In another refinement, the method may further comprise applying the sequence to an airfoil having the initial geometry.

In another refinement, the method may further comprise measuring an amount of variation in geometry from the initial geometry after applying the sequence.

In another refinement, the method may further comprise designing the new geometry of the airfoil to compensate for the measured amount of variation in geometry.

In yet another refinement, the method may further comprise compensating for the measured amount of variation in geometry by offsetting a lean and a twist in the new geometry of the airfoil.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

Figure 1:
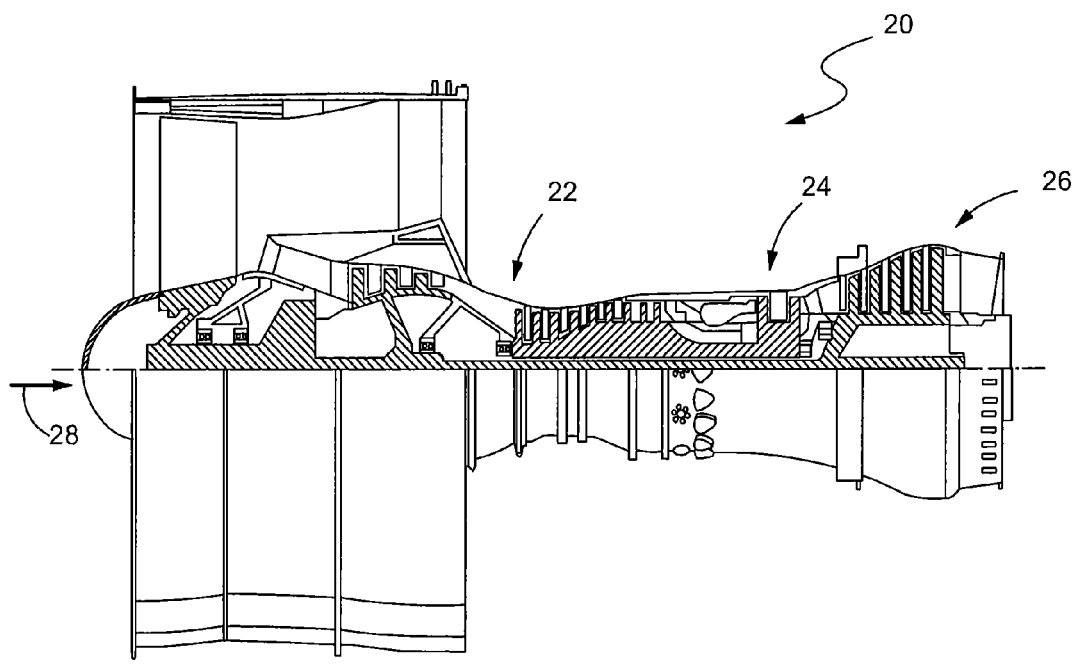
FIG. 1 is a cross-sectional view of a gas turbine engine constructed in accordance with the present disclosure.

Referring now to the drawings, and with specific reference to FIG. 1, in accordance with the teachings of the disclosure, an exemplary gas turbine engine 20 is shown. The gas turbine engine 20 may generally comprise a compressor section 22 where air is pressurized, a combustor 24 downstream of the compressor section which mixes and ignites the compressed air with fuel and thereby generates hot combustion gases, a turbine section 26 downstream of the combustor 24 for extracting power from the hot combustion gases, and an annular flow path 28 extending axially through each. The gas turbine engine 20 may be used on an aircraft for generating thrust or power, or in land-based operations for generating power as well.

Figure 2:
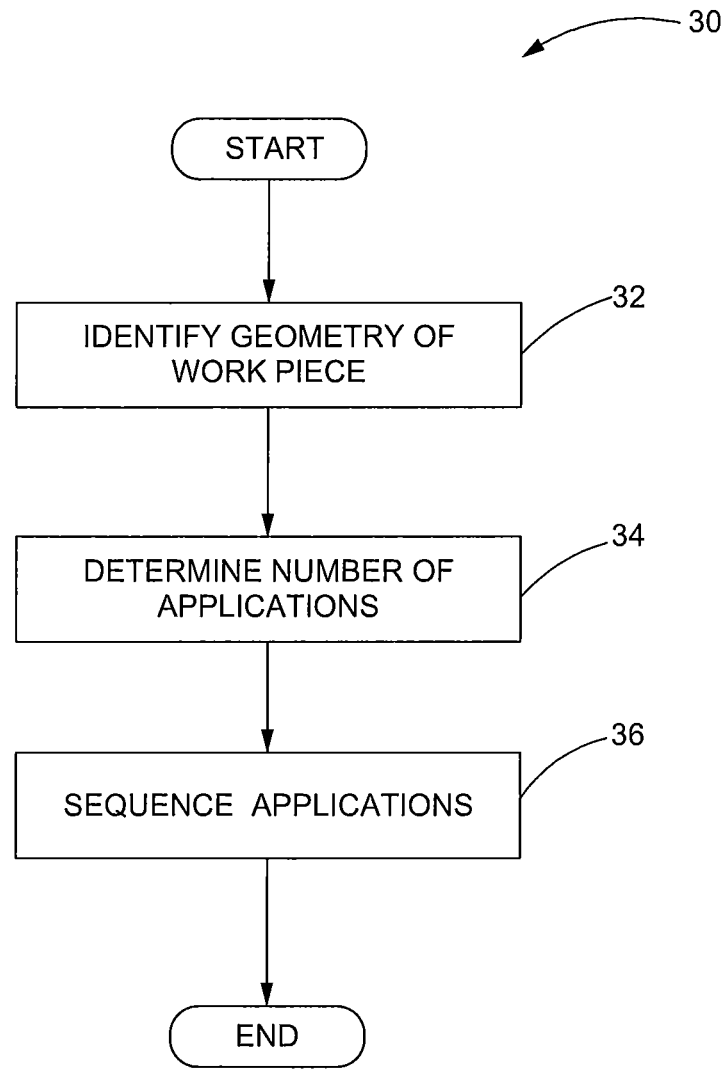
FIG. 2 is a flowchart outlining a method for applying laser shock peening (LSP) on a workpiece, according to one exemplary embodiment of the present disclosure.

To protect components of the gas turbine engine 20 from crack initiation and propagation, components may be treated via laser shock peening (LSP), which imparts residual compressive stresses into the component. Although laser shock peening is described herein, it is to be understood that other material improvement processes such as, but not limited to, shot peening, pinch peening, low plasticity burnishing (LPB), or the like, may be used instead of LSP to treat components without departing from the spirit of the disclosure. Referring now to FIG. 2, a flowchart outlining a method 30 for applying LSP on a workpiece is shown, according to an exemplary embodiment of the present disclosure.

Figure 3:
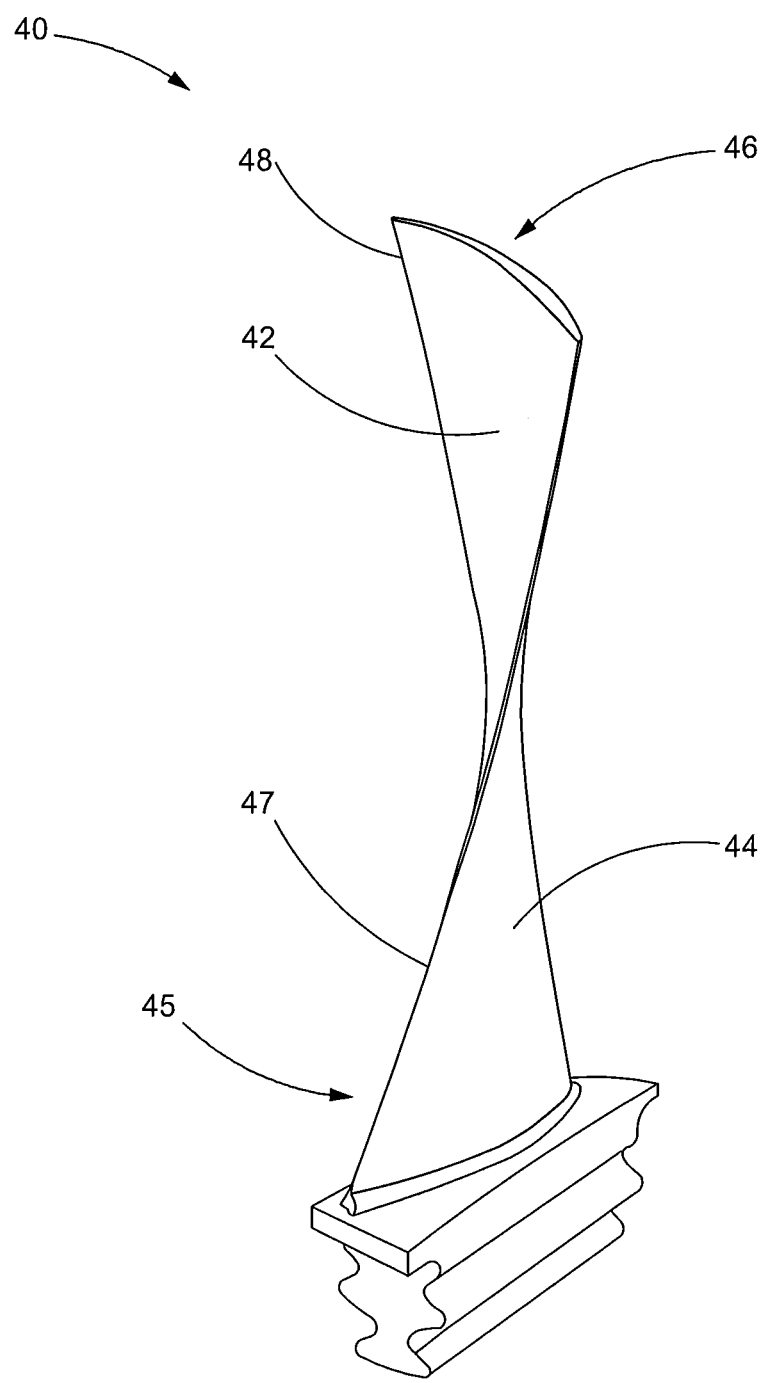
FIG. 3 is a perspective view of an airfoil of the gas turbine engine of FIG. 1.

The method 30 may be applied to any component of the gas turbine engine 20. For example, the method 30 may be applied to an airfoil 40 of the gas turbine engine 20, such as the one shown in FIG. 3. The airfoil 40 may comprise a rotor blade or stator vane in the compressor section 24 or turbine section 28 of the gas turbine engine 20. The airfoil 40 may comprise a first side 42 and an opposite second side 44 projecting radially from a base 45 to a tip 46 and extending axially (fore to aft) from a leading edge 47 to a trailing edge 48 (downstream of the leading edge 47).

At a first step 32 of the method 30, an original or initial geometry of the workpiece may be identified. For example, a coordinate measuring machine (CMM) may be used to measure the geometry of the workpiece, although other means of measurement are certainly possible. In the example of the airfoil 40 of FIG. 3, the CMM may be used to measure certain geometric features of the airfoil 40, such as, but not limited to, thickness, chord length, camber, twist, and lean.

At a next step 34, a number of applications of LSP to provide on the workpiece may be determined. One application of LSP may be provided on the workpiece or more than one application of LSP may be provided on the workpiece. For example, it may be determined that three applications of LSP may be provided to the first side 42 of the airfoil 40 and three applications of LSP may be provided to the second side 44 of the airfoil 40. More or less than three applications of LSP on each of the first and second sides 42, 44 are certainly possible.

Next, at a step 36, the applications may be provided in a sequence which minimizes distortion of the workpiece. After determining the initial geometry of the workpiece and the amount of applications of LSP, the sequence of applications may be arranged such that the initial geometry of the workpiece is not altered or minimally altered. For example, the applications may be sequenced among the first and second sides 42, 44 of the airfoil 40 such that there is minimal variation from the initial geometry of the airfoil 40 after providing the applications of LSP.

Figure 4:
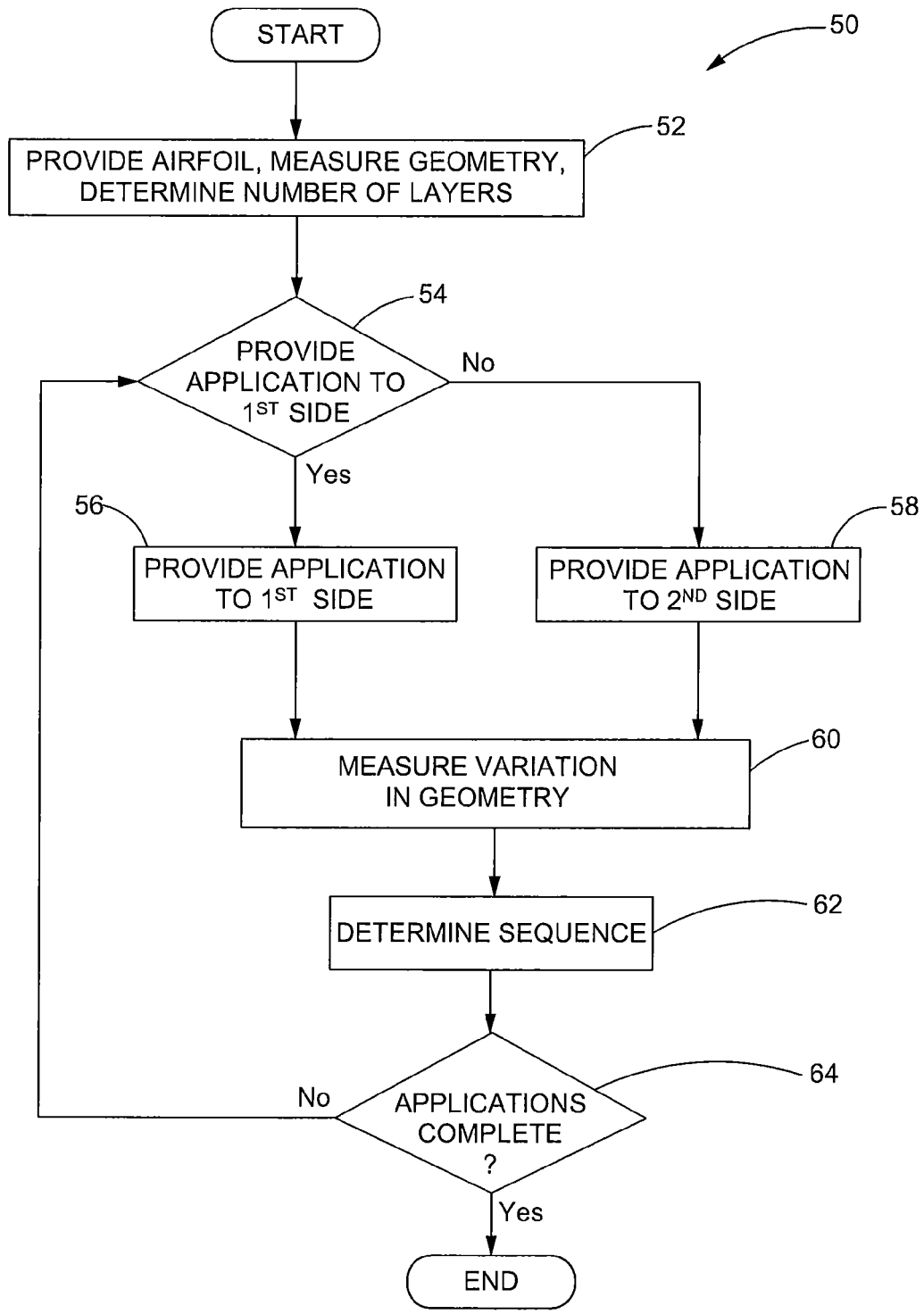
FIG. 4 is a flowchart outlining a method for determining a sequence for application of LSP on an airfoil, according to another exemplary embodiment of the present disclosure.

More specifically, the most beneficial sequence for application of LSP on the workpiece may be determined. For example in FIG. 4, a flowchart outlining a method 50 for determining the sequence for application of LSP is shown, according to another exemplary embodiment of the present disclosure. At a first step 52, the airfoil is provided, the geometry of the airfoil is measured, and the number of applications of LSP is determined. Next, at a step 54, either the first side 42 or the second side 44 of the airfoil is chosen for providing of one application of LSP. If the first side 42 is chosen, then the application is provided to the first side 42 of the airfoil 40 at a step 56. If the second side 44 is chosen, then the application is provided to the second side 44 of the airfoil 40 at a step 58.

Next, at a step 60, the variation in geometry of the airfoil 40 is measured. For example, at least one of a thickness, chord length, camber, twist, and lean may be measured by the CMM after each application to either of the first or second sides 42, 44. The change or variation in the measured geometric features may be then determined with reference to the initial geometry of the airfoil measured in step 52.

At a subsequent step 62, an order of the sequence of application of LSP on the first and second sides 42, 44 of the airfoil 40 is determined. For example, with regard to a first application of LSP, the first application may be provided to the first side 42 of the airfoil 40 and the variation in geometry may be measured. Separately, on another airfoil having the same geometry, the first application may be provided to the second side 44 of the airfoil 40 and the variation in geometry may be measured. Comparing the variation in geometry when the first application is provided to the first side 42 with the variation in geometry when the first application is provided to the second side 44, the side (first 42 or second 44) to provide the first application may be determined.

For example, the first and second sides 42, 44 may have different contours, with the first side 42 being a pressure side of the airfoil 40 and the second side 44 being a suction side of the airfoil 40. Due to the different shapes of pressure and suction surfaces, the first application on either the pressure side or the suction side may have different effects on the geometry of the airfoil 40. For example, because the pressure side is flatter than the curved suction side, the first application upon the pressure side may result in a smaller variation in geometry of the airfoil 40 than the variation in geometry after the first application upon the suction side. Therefore, it may be determined that the first application should be provided to the pressure side or first side 42 of the airfoil 40 as a beginning order of the sequence. It is to be understood the first application may also be provided on the suction side or second side 44 of the airfoil 40 as the beginning order of the sequence without departing from the scope of the present disclosure.

Next, at a step 64, if the determined number of applications (step 52) are all provided to the airfoil 40 or completed, then the method 50 is at an end. However, if more applications are to be provided to the airfoil 40, then the method proceeds to step 54 and the process is repeated for the determined number of applications. Based on the measured changes or variations in geometry of the airfoil 40 after each successive application, the most beneficial sequence is determined. For example, the method 50 may be repeated using different sequences, such as changing the order of the applications between the first side 42 and the second side 44 determined at step 54. For each different sequence, after a last application is provided and the variation in geometry is measured, the amount of variation in geometry among the difference sequences is compared. A sequence having the minimum amount of variation from the initial geometry of the airfoil 40 (or the least amount of distortion to the airfoil 40) would then be determined as the most beneficial sequence.

In an example of three applications to the first side 42 and three applications to the second side 44 (six applications in total), with the first side 42 being the pressure side and the second side 44 being the suction side, the most beneficial sequence may be a first application to the first side 42, a subsequent second application to the second side 44, a subsequent third application to the second side 44, a subsequent fourth application to the first side 42, a subsequent fifth application to the first side 42, and a subsequent sixth application to the second side 44. The most beneficial sequence may result in the least amount of distortion to the geometry of the airfoil 40. It is to be understood that the described sequence is for exemplary purposes only, and that other sequences are certainly possible.

It is to be understood that although described as having the minimum amount of variation from the initial geometry of the airfoil (or the least amount of distortion to the airfoil), the determined sequence may also result in no amount of variation from the initial geometry of the airfoil or zero distortion to the airfoil. In addition, determined sequences may differ from one airfoil to the next depending on the geometry of the airfoil and/or the number of applications of LSP on the airfoil. These various sequences are positively within the scope of this disclosure.

Figure 5:
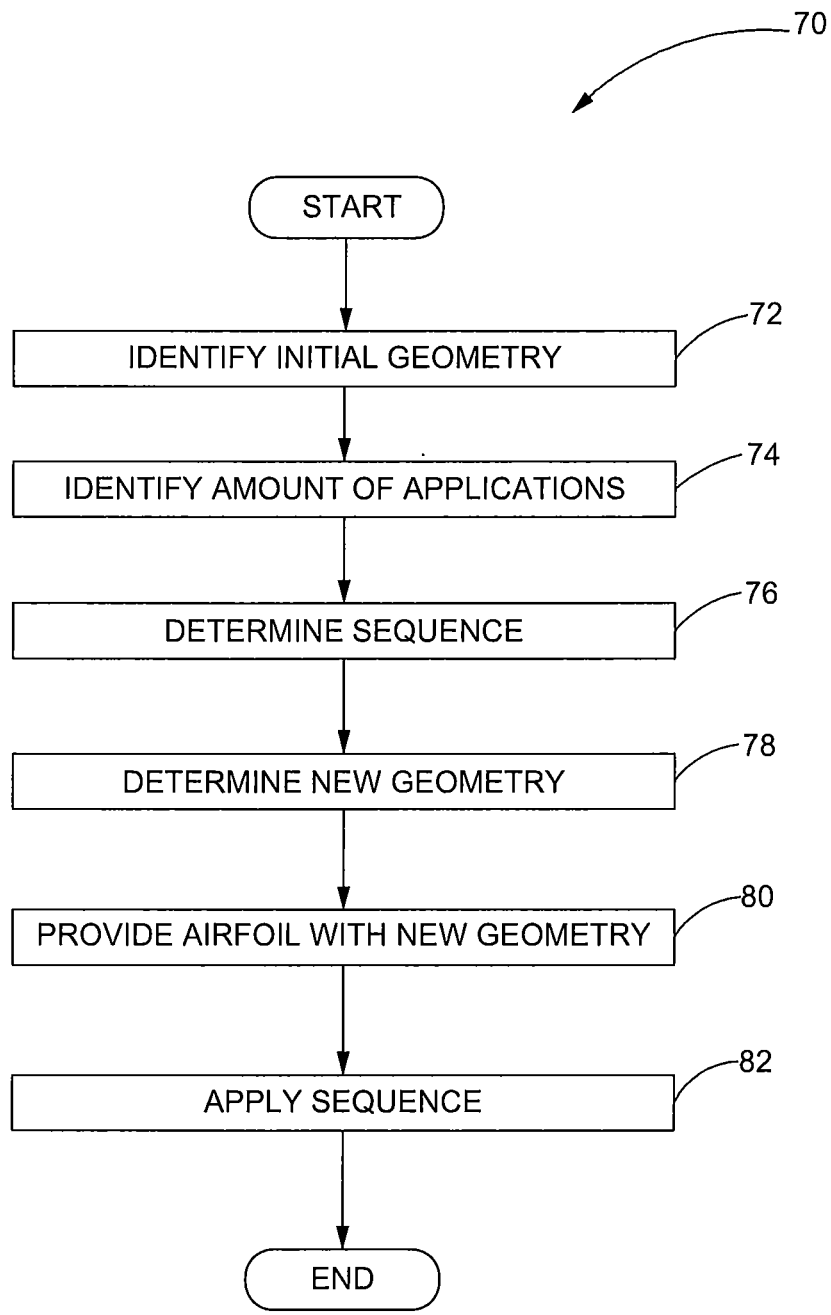
FIG. 5 is a flowchart outlining a method for manufacturing an airfoil of a gas turbine engine, according to yet another exemplary embodiment of the present disclosure.

Referring now to FIG. 5, a flowchart outlining a method 70 for manufacturing an airfoil of a gas turbine engine is shown, according to yet another exemplary embodiment of the present disclosure. At a first step 72, the original or initial geometry of the airfoil 40 may be measured, as described above. At a next step 74, the number of application of LSP to upon the airfoil 40 may be determined. Next, at a step 76, the sequence for the applications may be determined, such as, via method 50 in FIG. 4 described above.

At a next step 78, a new geometry for the airfoil 40 may be determined based on the initial geometry of the airfoil from step 72 and the determined sequence from step 76. More specifically, the determined sequence may be applied to the airfoil 40 and an amount of variation from the initial geometry may be measured. The new geometry may be designed to compensate for the measured amount of variation from the initial geometry. The new geometry may offset certain dimensions to account for distortion produced by application of LSP on the airfoil.

For example, if application of the determined sequence for LSP resulted in a greater amount of lean in one direction (from the initial, i.e. blueprint, geometry), then the new geometry would compensate for this distortion by offsetting its lean from the initial geometry in the other direction by the measured amount of variation. In another example, if application of the determined sequence for LSP resulted in a greater amount of twist, then the new geometry would account for this distortion by having a lesser amount of twist in the measured amount of variation from the initial geometry. Distortions in other geometric dimensions, such as, including but not limited to thickness, chord length, and camber, may also be accounted for in the new geometry. Thus, the new geometry may compensate for the variation in an opposite direction and equal magnitude from the initial geometry.

Next, at a step 80, a new airfoil may be provided according to the new geometry. Lastly, at a step 82 the sequence from step 76 may be applied on the new airfoil having the new geometry. As a result of the distortion being compensated for in the new geometry in step 78, when the determined sequence for the applications of LSP is provided in step 82, the geometry of the new airfoil may be substantially identical to the initial or blueprint geometry for the airfoil, measured in step 72. In so doing, an initial or blueprint geometry for the airfoil may be achieved, effectually having no distortion.

It is to be understood that other steps in the manufacturing method 70 may be added, such as finishing, without departing from the scope of the disclosure. In addition to sequencing the applications, an intensity of the applications may also be varied from the first side 42 to the second side 44 to minimize or eliminate distortion. Furthermore, although described as applying to an airfoil of the gas turbine engine, the disclosed methods 30, 50, 70 may certainly be applied to other components of the gas turbine engine, as well as non-engine related components.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides a method to minimize the distortion in parts due to material improvement processes. By sequencing the applications of LSP, the total distortion of the part can be eliminated or minimized. In addition, sequencing applications can reduce the extent of antagonistic stresses in an airfoil, thereby resulting in a more robust part. Furthermore, the disclosed methods may be applied to new and used parts to extend the life of the part, thereby reducing overall maintenance costs.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, but rather includes all embodiments and equivalents encompassed within the claims appended hereto as well.

What is claimed is:

1. A method for laser shock peening (LSP) a workpiece, comprising: identifying a geometry of the workpiece;
    determining a number of non-simultaneous applications of LSP upon a first side and a second side of the workpiece; and
    sequencing the non-simultaneous applications among the first side and the second side to minimize distortion, wherein each non-simultaneous application of LSP on the first side occurs at a different time than each non-simultaneous application of LSP on the second side.

2. The method of claim 1, further comprising providing one application to the first side of the workpiece, and measuring a change in geometry of the workpiece.

3. The method of claim 1, further comprising providing one application to the second side of the workpiece, and measuring a change in geometry of the workpiece.

4. The method of claim 1, further comprising determining which side of the workpiece to provide a first application of LSP.

5. The method of claim 1, further comprising determining a sequence of the non-simultaneous applications based on measured changes in geometry of the workpiece after each successive application.

6. The method of claim 1, further comprising using a coordinate measuring machine (CMM) to measure the geometry of the workpiece.

7. A method for laser shock peening (LSP) an airfoil, comprising: identifying an initial geometry of the airfoil;
    determining a number of non-simultaneous applications of LSP upon each of a first side and a second side of the airfoil; and
    providing the non-simultaneous applications in a sequence having a minimum amount of variation from the initial geometry of the airfoil, wherein each non-simultaneous application of LSP on the first side occurs at a different time than each non-simultaneous application of LSP on the second side.

8. The method of claim 7, further comprising further comprising providing three non-simultaneous applications to each of the first side and the second side of the airfoil.

9. The method of claim 7, further comprising determining the sequence based on an amount of variation from the initial geometry of the airfoil after each application.

10. The method of claim 7, further comprising providing the sequence as a first application to the first side, a second application to the second side, a third application to the second side, a fourth application to the first side, a fifth application to the first side, and a sixth application to the second side.

11. A method for manufacturing an airfoil of a gas turbine engine, comprising: measuring an initial geometry of the airfoil;
    determining a number of non-simultaneous applications of laser shock peening to provide on the airfoil;
    determining a sequence for the non-simultaneous applications, wherein each non-simultaneous application of LSP on the first side occurs at a different time than each non-simultaneous application of LSP on the second side;
    determining a new geometry for the airfoil based on the initial geometry and the sequence;
    providing an airfoil according to the new geometry; and applying the sequence on the airfoil having the new geometry.

12. The method of claim 11, further comprising measuring the initial geometry of the airfoil, including at least one of thickness, chord length, camber, twist, and lean.

13. The method of claim 11, further comprising providing a first application to a pressure side of the airfoil.

14. The method of claim 13, further comprising providing a second application to a suction side, a third application to the suction side, a fourth application to the pressure side, a fifth application to the pressure side, and a sixth application to the suction side.

15. The method of claim 11, further comprising providing non-simultaneous applications to the pressure and suction sides of the airfoil and measuring variations in geometry to determine the sequence.

16. The method of claim 15, further comprising determining the sequence based on a sequence having a smallest amount of variation in geometry.

17. The method of claim 16, further comprising applying the sequence to an airfoil having the initial geometry.

18. The method of claim 17, further comprising measuring an amount of variation in geometry from the initial geometry after applying the sequence.

19. The method of claim 18, further comprising designing the new geometry of the airfoil to compensate for the measured amount of variation in geometry.

20. The method of claim 19, further comprising compensating for the measured amount of variation in geometry by offsetting a lean and a twist in the new geometry of the airfoil.